Oct. 22, 1968    W. I. ELLIOTT ET AL    3,407,251
METHOD FOR FORMING COOPERATIVELY THREADED PARTS
Filed Nov. 29, 1965

INVENTORS
WILLIAM I. ELLIOTT
JACK L. RANDALL
Fulwider, Patton, Rieber,
Lee, and Utecht
ATTORNEYS

United States Patent Office 3,407,251
Patented Oct. 22, 1968

3,407,251
METHOD FOR FORMING COOPERATIVELY THREADED PARTS
William I. Elliott, 5172 Dumont Place, Woodland Hills, Calif. 91364, and Jack L. Randall, 27 Malibu Colony, Malibu, Calif. 90265
Filed Nov. 29, 1965, Ser. No. 510,169
5 Claims. (Cl. 264—135)

ABSTRACT OF THE DISCLOSURE

A method of forming cooperatively threaded parts wherein a rod is coated with a bonding material and a wire is helically wound along the length of the rod. A split ring of spring material provided with a lining of deformable plastic material is placed over the wire, and the plastic inner surface is deformed under heat and/or pressure so that the surface conforms to the portions of the wire confronting the lining.

---

This invention relates to threaded elements, and more particularly to a unique construction for and method of forming matingly threaded rod and nut elements.

The traditional method of forming mating threads on parts which are to undergo rotational and/or linear movements involves cutting material from each part to form threads of predetermined contour and pitch. A disadvantage of this method is that the thread cutters are subject to such wear that the dimensions of the lands and grooves of successively threaded parts are not precisely the same.

One result of this is that parts to be threaded together do not mate, but bind, and it frequently becomes necessary to result to trial and error to find a nut which can be readily threaded onto a bolt. Another, of course, is that the cutters must be replaced periodically.

The cutting technique also has the disadvantage that the material being cut away occasionally gets wedged on a land or in a groove, resulting in the threads being damaged by continued operation of the cutter. The parts thus damaged must be discarded. If the cutter is also damaged, a complete run of parts with threads formed thereby must be discarded.

Another method of forming parts with mating threads is that of molding, e.g., forming parts in molds containing the desired thread design. Forming threaded parts in this manner has the advantage of avoiding undesired variations in thread dimensions.

However, in none of the prior art techniques has it been possible to make cooperatively threaded parts having a wide variety of thread sizes without an equally large number of cutting tools and molds. One cutting tool or mold is required for each thread size.

Still further, there is no known method by which to produce parts with extremely small threads, e.g., 2,000–5,000 threads per inch. Threads of such small size would be useful in linear actuators, for example, where it is desired to make extremely fine adjustment of the position of a linearly movable part.

It is an object of our invention to provide cooperatively threaded parts without molds or cutting tools.

It is another object of our invention to provide a new and useful method of forming matingly threaded elements in large volume with uniform characteristics.

A further object of our invention is to provide a unique threaded element of simple design and rugged construction.

Figure 1:
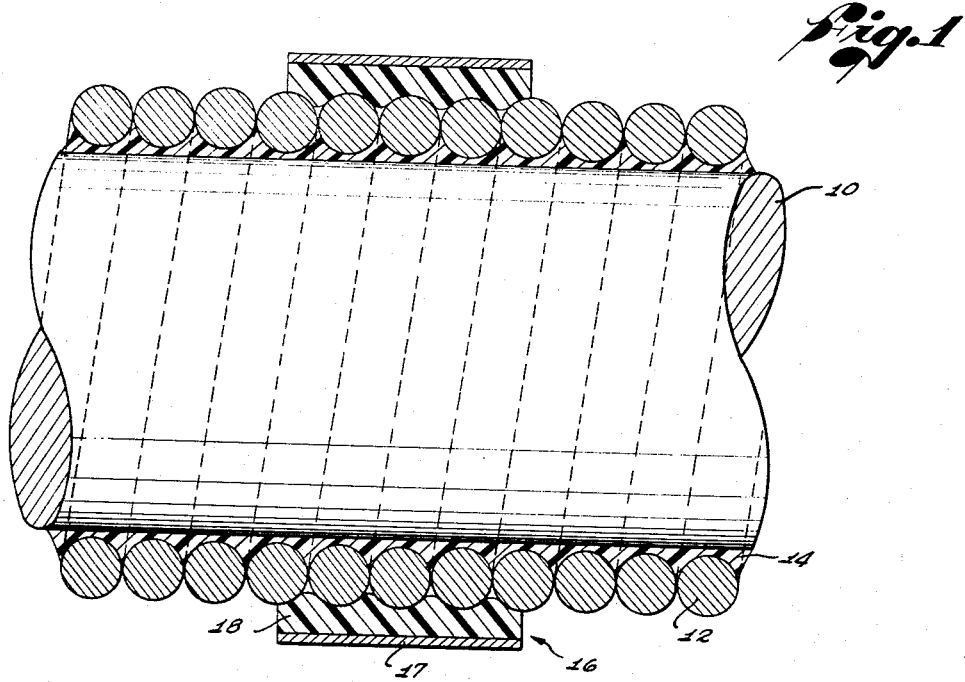
Figure 2:
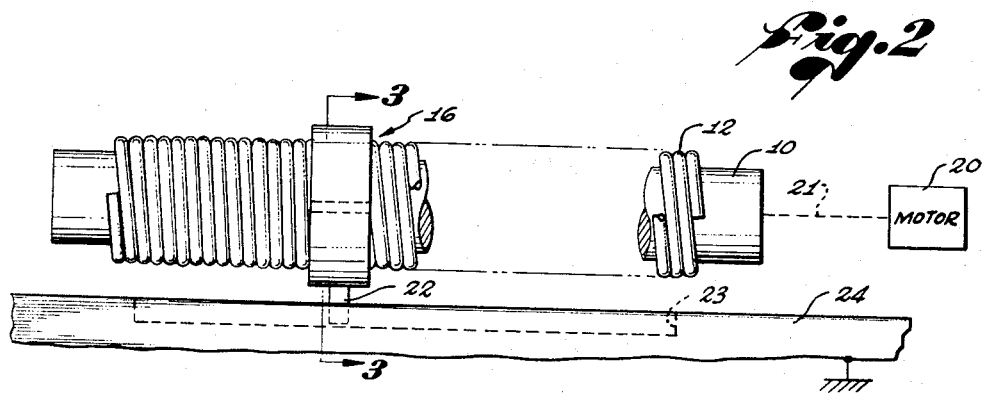
Figure 3:
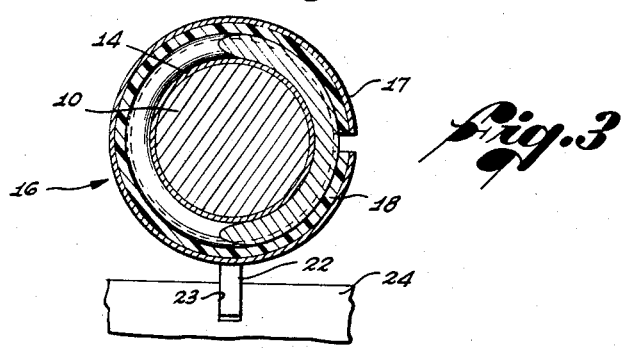

The above and other objects and advantages of our invention will become apparent from the following description taken in conjunction with the accompanying drawing of an illustrative embodiment thereof, in which:

FIGURE 1 is a fragmentary sectional view of thread-forming wire wound around a rod and surrounded by a nut element having conforming internal grooves, showing bonding material securing the wire to the rod;

FIGURE 2 is a longitudinal view of the rod of FIGURE 1 and the nut thereon, showing the rod adapted for rotation by a motor, and wherein the nut is restricted against rotation for undergoing longitudinal movement; and FIGURE 3 is a sectional view taken along the line 3—3 of FIGURE 2, showing the key and keyway arrangement for limiting the nut to longitudinal movement, and also showing the nut as a spring clip element.

Referring to FIGURE 1, there is shown a rod 10 on which a wire 12 is wound, and wherein bonding material 14 is located between the wire 12 and the rod 10 for bonding the rod and wire together, and for holding the adjacent turns of the wire stationary.

Surrounding the wire 12 is a nut 16 which is formed of a split ring 17 of spring material, and a liner of plastic material 18 which is bonded to the inner surface of the ring 17. As shown, the nut 16 spans several turns of the wire 12, and the inner surface of the plastic liner 18 has grooves therein which conform to the outer portions of the wire turns spanned thereby. With this arrangement, the rod 10 and nut 16 may be subjected to relative longitudinal movement, either by rotating the nut while restraining the rod against rotation, or vice versa.

FIGURE 2 illustrates an arrangement wherein the rod 10 is rotated, and the nut 16 is restrained against rotation. In this connection, a reversible motor 20 is coupled at 21 to the rod 10 for effecting its rotation, and the nut 16 is provided with an external finger 22 which fits in an elongated keyway 23 which is formed in a member 24 that extends alongside the rod 10 and parallel thereto.

Alternatively, of course, the nut 16 may be arranged for rotation, but restricted against longitudinal movement, in which case the rod 10 will be subjected to longitudinal movement in one direction or the other, depending upon the direction of rotation of the nut.

The method of forming the cooperatively threaded parts of our invention will be described with reference to FIGURES 1 and 3. The rod 10 is initially coated with the bonding material, e.g., by spraying the surface of the rod with a suitable thermoplastic resin. If desired, such coating is heated, and then allowed to harden.

Next, the wire 12 is wound on the rod. Such winding preferably is accomplished with a wire winding machine, which preferably winds the wire on the rod so that the adjacent turns abut each other. Prior to or during the winding process, the rod is wetted with additional plastic material, which preferably is the same material as that initially applied thereto. The ends of the wire are suitably secured to the rod 10, e.g., as by soldering, or by bending the ends and inserting them in openings (not shown) in the rod, or in any other suitable fashion.

After winding the wire on the rod in the manner described, the assembly of the wire and rod is heated at a sufficient temperature, e.g., 325° F., until the plastic material flows sufficiently to cause the wire to be embedded therein. Following such heating, which may be carried on at ambient pressure, the plastic material is allowed to harden. The resulting construction is the rod with the wire securely bonded thereto.

After forming the wire on the rod as above described, we next form the nut 16. To do this, we form the plastic liner 18 on the inner surface of the ring, and bond the liner to the ring. Next, the ends of the ring are spread apart sufficiently to permit it to be slipped over the wire 12, and are then released to bring the inner surface of the liner 18 to bear against the turns of the wire spanned thereby. The liner 18 may be formed of a plastic material which will deform upon application of pressure alone. In such case, the clamping of the ring 17 onto the wire causes the material of the liner 18 to deform and assume the shape indicated in FIGURE 1, wherein portions of the liner between adjacent turns are forced into the space between adjacent turns, and otherwise follows the contours of the turns.

The liner 18 may be formed of other plastic materials having long-wearing qualities, and which cannot be initially deformed by the mere clamping pressure exerted by the ring 17. Such materials may include various of the thermoplastics, e.g., nylon molding compounds, polyethylenes, polyvinyls, and others. Thus, our invention embraces the use of plastic materials having any desired wearing and heat-resistant qualities. To heat the liner 18 formed of some such materials, and deform it for the desired purpose, the clip 17 and liner 18 may be heated preparatory to placement around the wire, thereby to permit the pressure exerted by the ring 17 on cooling to cause the liner to deform in the desired manner. Alternatively, the ring and liner may be placed over the wire, and the wire heated by passing current therethrough, whereupon the combination of the pressure exerted by the ring 17 and the heating of the inner surface of the liner 18 forces such inner surface to assume the desired contour. Still further, of course, the ring and liner may be placed over the wire, and the entire assembly heated until the inner surface of the liner assumes the desired contour.

In the previously described step of forming the wire on the rod, it will be apparent that our invention embraces the use of any suitable material to secure the wire to the rod, e.g., solder, glue or the like. The material may be coated on the rod to any desired thickness, and may be so thin that the wire is brought into engagement with the rod when securing it thereto. In this last connection, the wire may be wound on the rod while the bonding material is plastic enough to permit the turns to engage the rod. For the nut 16, the liner 18 may be formed as a separate C-shaped element, which is secured to the inner surface of the ring 17 by cementing, or it may be sprayed on the inner surface of the ring to a desired thickness.

Our invention permits the formation of cooperatively threaded parts with wire of any desired diameter. Such wire may be quite large, e.g., 0.25" diameter or larger, to extremely fine, e.g., 0.0004" diameter. With such extremely fine wire, our invention provides a linear actuator capable of extremely fine adjustments of the position of the movable part, e.g., for 2,500 turns/inch, a complete revolution of the rod 10 effects linear movement of the nut 16 of only 0.0004".

It will be apparent from the foregoing that our invention embraces various modifications in the method and construction for cooperatively threaded parts illustrated and described herein. Accordingly, we do not intend that our invention be limited, except as by the appended claims.

We claim:

1. The method of forming cooperatively threaded parts comprising the steps of:
   winding a wire along a rod;
   securing said wire to said rod;
   forming a split ring with a plastic inner surface;
   placing said ring on said wire;
   and deforming said plastic inner surface of said ring by compressing said surface against said wire so that said surface conforms to the portions of said wire confronted thereby.

2. The method of claim 1, including the step of coating the rod with bonding material preparatory to winding the wire thereon.

3. The method of claim 1, wherein said split ring is composed of spring material, and the step of forming said split ring with a plastic inner surface includes forming a lining of plastic material on the inner surface of said ring of spring material.

4. The method of claim 3, wherein the deforming step includes heating the lining to cause the material thereof to deform to the contour of the portions of the wire confronted thereby.

5. The method of claim 4, wherein heating the lining includes passing electric current through the wire to heat the portions of the lining engaging the wire.

References Cited

UNITED STATES PATENTS 3,094,376   6/1963   Thomas _____ 264—135

ROBERT F. WHITE, *Primary Examiner.*

K. J. HOVET, *Assistant Examiner.*